Figure 1:
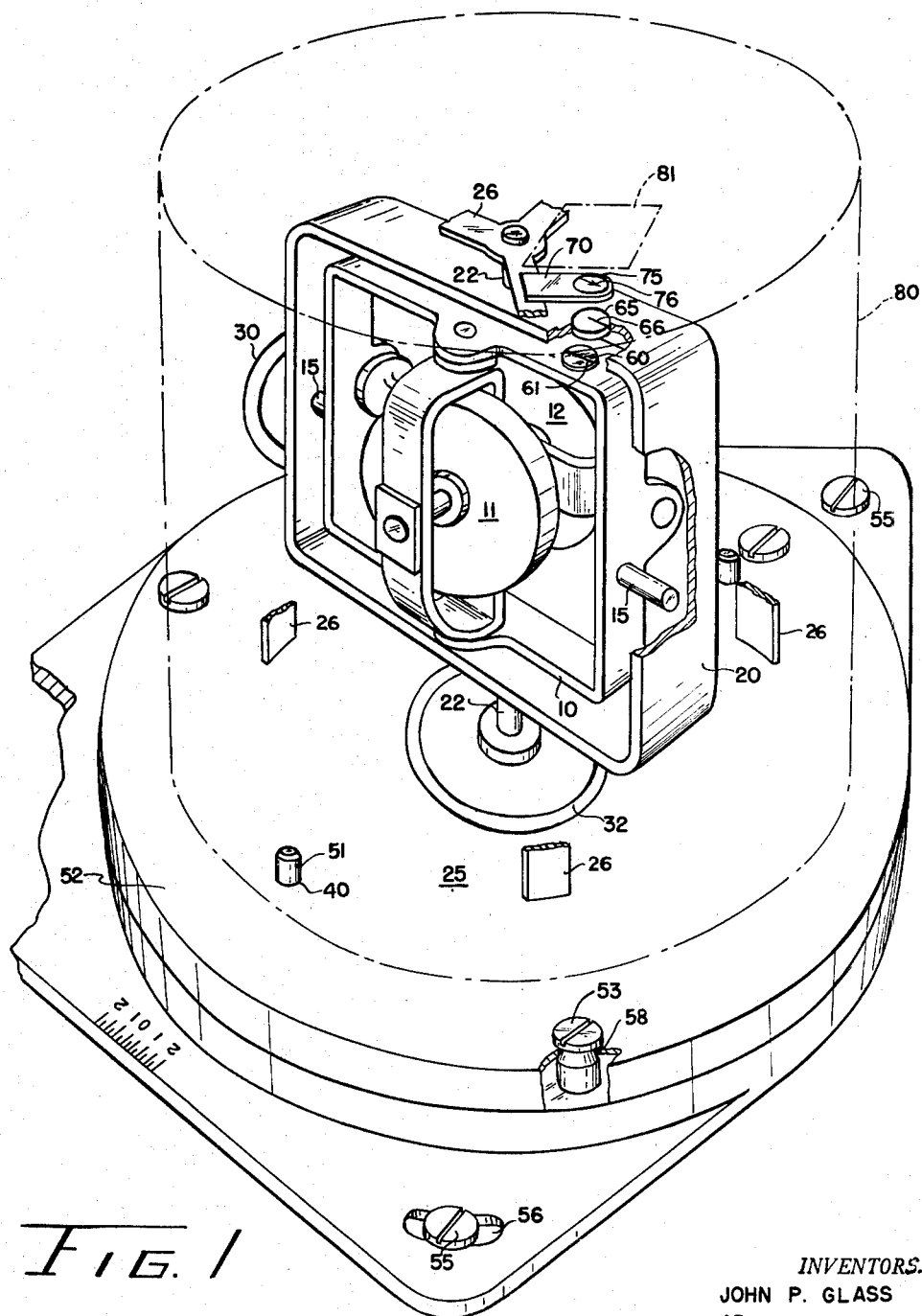

June 22, 1954  J. P. GLASS ET AL  2,681,576
GYROSCOPIC APPARATUS
Filed Oct. 22, 1952  2 Sheets-Sheet 1

INVENTORS.
JOHN P. GLASS
BY  ARNOLD E. HAYES
George H. Fisher
ATTORNEY

June 22, 1954   J. P. GLASS ET AL   2,681,576
GYROSCOPIC APPARATUS

Filed Oct. 22, 1952   2 Sheets-Sheet 2

INVENTORS.
JOHN P. GLASS
BY   ARNOLD E. HAYES

George H Fisher
ATTORNEY

Patented June 22, 1954

2,681,576

UNITED STATES PATENT OFFICE 2,681,576

GYROSCOPIC APPARATUS

John P. Glass, Clifton Heights, and Arnold E. Hayes, Penfield, Pa., assignors to Minneapolis-Honeywell Regulator Company, Minneapolis, Minn., a corporation of Delaware Application October 22, 1952, Serial No. 316,188

13 Claims. (Cl. 74—5)

Our invention relates in particular to equipments included on and with a gyroscope to aid in the installation of a gyroscope on an object to which it is to be mounted, such as an aircraft, and in the checking of the gyroscope for alignment with the axes of the object and with cooperating signaling devices mounted thereon once the gyroscope has been installed on the object. These improvements also permit rapid interchangeability of gyroscopic devices on the object without recalibration and check of the installation.

The installation of gyroscopic devices upon an aircraft for use with the aircraft generally requires a correlation between the displacement axis of gyroscope and the axes of the aircraft in flight attitudes together with correlation of the signalling devices associated with the gyroscope such that the outputs of the signalling devices will be predetermined for given displacements of the gyroscope about the axes thereof before the signalling devices on the gyroscope can be incorporated in control systems used in controlling or navigating the aircraft. In most gyroscope stabilizing systems for aircraft, it is essential that under conditions of the alignment of the gyroscope axes with those of the aircraft there is provided a zero output from the signal pick-off devices on the gyroscope before the gyroscopic equipment can properly operate to control flight of the aircraft. If such is not the case, the aircraft in stabilized flight will fly with a wing low or nose up attitude or be subject to azimuthal deviations. Because of the accuracy required in the alignment of the gyroscope and the electrical signalling devices with the air frame, such installation work is generally done at a factory or installation center where jigs or other special equipment are available. Once the gyroscope is properly installed and aligned, the equipment should operate properly but if for any reason it becomes necessary to remove the gyroscope to check the same, the previous alignment problems in connection with the installation are again present and the reinstallation will generally be completed only at a center having the special equipments for performing and calibrating alignment of the equipments on the airplane. This gives rise to expensive and time consuming delays in the performing of minor repair operations on gyroscopes where it is necessary to remove the gyroscope from the aircraft to complete the same. In stabilizing devices the discrepancies between the signalling device and the axes of the aircraft produce what is known as a zero error which gives rise to the improper operation of the aircraft under stabilized control referred to above. There are two sources of this error: one is the mounting of the gyroscope in the air frame, and the other source is the centering of the signalling device on the gyroscope when the axes of the gyroscope are in predetermined positions. In the present improvements in gyroscopic apparatus we have provided apparatus for mounting the gyroscope in an airplane in such a manner that after the initial factory alignment is completed, the air frame will include a reference equipment continuously aligned with the axes of the air frame upon which the gyroscope can be mounted and removed and similar units may be interchanged without requiring realignment of the instrument with the aircraft. We have further provided in the gyroscope a means for visually checking alignment of the gyroscope parts such that when alignment is present the signalling device may be checked to determine whether the predetermined signal output is present or not and permit adjustment of the signal output of the signalling devices if these conditions are not present. Thus once the initial installation is completed, the gyroscopic apparatus may be removed from the air frame and checked or repaired and replaced in the air frame without requiring further alignment nor recalibation with special jigs or equipment.

It is therefore an object of this invention to provide an improved gyroscopic apparatus.

It is further an object of this invention to provide in an improved gyroscopic apparatus a sub-base assembly which when accurately located in an aircraft will provide a permanent reference in the air frame upon which gyroscopes can be mounted or interchanged without requiring further alignment of the gyroscopic apparatus with the airplane.

It is also an object of this invention to provide in a gyroscope a visual means of checking alignment of the parts of the gyroscope with the signalling devices.

Figure 2:
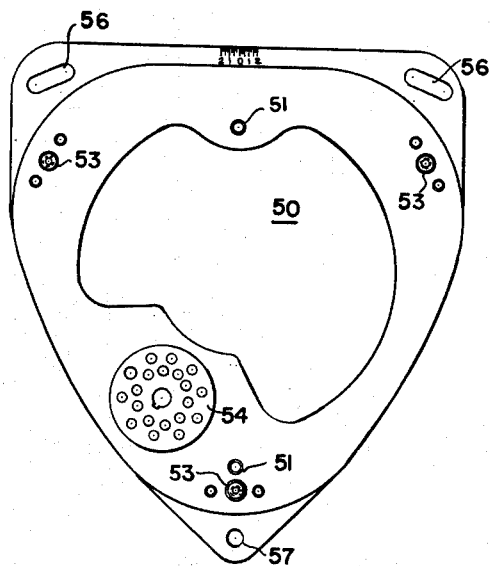
Figure 3:
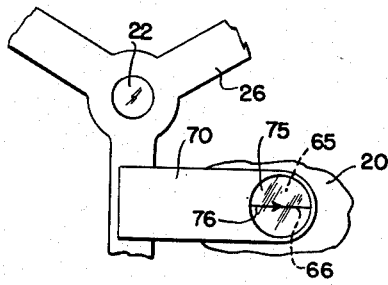
Figure 5:
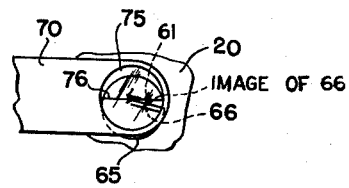
Figure 4:
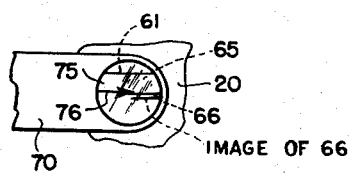

These and other objects of this invention will become apparent from the reading of the attached description together with the drawings wherein:

Figure 1 is a perspective view of a gyroscope with a cover member shown in phantom and embodying the features of the present invention, Figure 2 is a plan view of a sub-base assembly of our improved gyroscopic apparatus, Figure 3 is a schematic view of reticles or apparatus for checking the alignment of the gyroscope parts with a showing of the indicia under conditions of alignment of the gyroscope parts, and Figures 4 and 5 are schematic showings of the indicia of the alignment checking apparatus under conditions of disalignment.

Our invention is shown herein in connection with a stabilized platform which is disclosed in the copending application of Daniel G. Taylor, Serial No. 280,480, filed April 4, 1952, and assigned to the same assignee. Many of the details of the stabilizing device or gyroscope are omitted herein for simplicity. However, it will be seen that the gyroscope includes an inner gimbal 10 mounting a pair of single axis displacement gyroscopes 11 and 12 which are so mounted on the inner gimbal that their displacement axes are normal to one another. The inner gimbal includes a pair of pivot members 15 which pivotally mount the inner gimbal on an outer gimbal 20 through suitable means not shown. Outer gimbal 20 is similarly pivoted through pivots 22 cooperating with suitable bearing means (not shown) on a base portion 25 of a frame and an upstanding portion 26 of the frame, sections of which are cut away to disclose the details of the gyroscope. Associated with the inner gimbal 10 through its pivotal axis or pivots 15 is a signalling device as generally indicated at 30 which is schematically shown and may take the form of a potentiometer type device or a synchronous signal generating type of device generally known as a synchro. Similarly the outer gimbal has associated therewith a second signal generating device indicated generally at 32 which is mounted on the pivots 22 of the outer gimbal 20 and associated with the frame and outer gimbals such that relative displacement between these parts when the signal generating device is energized will provide a signal output. Similarly the signal generating device 30 is also associated with the outer gimbal 20 such that displacement of the inner gimbal 10 relative to the outer gimbal 20 will provide a signal output when the signal generator device is energized. Since the electrical connections and other associated equipments with the gyroscope form no part of the present invention other than to provide for proper and conventional operation of the gyroscope their details are omitted here for simplicity. The base portion 25 of the frame includes a plurality of dowel holes or apertures 40 which are accurately machined and positioned in the base portion 25 of the frame for purposes which will become evident hereinafter. As shown in Figure 1, a base portion 25 of the frame sits on a sub-base assembly 50 which includes a plurality of dowel pins 51 designed to fit into the dowel holes or mounting holes 40, of the base portion 25 of the frame to mount the same. A suitable attachment means such as fastener means 53 extend through apertures 59 of base portion 25 and clamp the base portion 25 of the frame to the sub-base assembly 50. Figure 2 also shows an adapter or connector member 54 designed to receive a prong terminal member (not shown) on the gyro base portion 25 to provide for electrical plug in type of connection between the gyroscope and the object on which the gyro is mounted. The sub-base assembly also includes a plurality of apertures 56, 57 through which suitable clamping means, such as screws 55, extend to secure the sub-base assembly to the object upon which the gyroscope is to be mounted. Two of the apertures 56 are enlarged or elliptically shaped, as shown in Figure 2, to permit adjustment of the sub-base assembly on the object before the sub-base assembly is clamped thereto such that the sub-base assembly may be aligned with the axes of the object such as the air frame of an airplane. As pointed out above, the installation of the sub-base assembly on the air frame of an aircraft is generally done at an installation center or factory at the time of initial installation of the gyroscope in the aircraft. At this time, the axes of the aircraft are aligned with the axes of the gyroscope and in this case with the dowel pins of the sub-base assembly such that the dowel pins will remain after installation as a permanent reference in the air frame upon which the gyroscope can be mounted or removed without requirement of further alignment with the air frame. This insures that gyroscopes having similar base portions with dowel holes 40 therein and with the same relationship between the gimbals and the base portion 25 may be readily interchanged and mounted on the same sub-base assembly without requiring further mechanical alignment of the parts.

To provide a check on the parts of a gyroscope, that is the gimbals relative to the signalling devices, provision is made for mounting the mirror such as indicated at 60 with an inscribed line 61 thereon on the inner gimbal 10 and a reticle 65 or suitable transparent means with an indicia 66 or cross hair therein in the outer gimbal 20. Attached to the upstanding portion 26 of the frame through a bracket 70 is a second reticle or transparent viewing means 75 having an indicia or hair line thereon 76. When the gimbals 10 and 20 of the gyroscope are in a predetermined position with respect to the air frame or base portion 25, the mirror 60 may be viewed by looking down on the reticle 75 and through the reticles 75 and 65 on to the mirror which gives a reflection of the cross hair 66 together with the direct view of the cross hairs 66 and 76 of the reticles 65 and 75 with the cross hairs being aligned or coincident with inscribed line 61 on mirror 60. Reference to Figure 3 will disclose the position of the cross hairs or indicia under these conditions of alignment. In order to determine which of the gimbals is out of alignment with the frame 26, the indicia or cross hair 76 carries a small arrow head thereon. The mirror 60 will provide an image of the cross hair 66 of the reticle 65 together with the view of the line 61 which must be aligned with the cross hair 66 of the reticle 65 to indicate alignment of the outer gimbal 20 with the inner gimbal 10. Similarly the cross hair 66 must be aligned with the cross hair 76 of reticle 75 and inscribed line 61 of mirror 60, to indicate alignment between the outer gimbal 20 and the upstanding portion 26 of the base or frame.

Figure 4 shows an example of alignment between the frame 26 and outer gimbal 20 with a disalignment between the inner and outer gimbals. The cross hairs 76 and 66 are aligned but because the plane of the mirror is shifted and is not parallel to the line of sight, the etched line 61 of the mirror 60 is to one side of the cross hairs 76 and 66 and the image of cross hair 66 is to the opposite side of the cross hairs 76 and 66. It is assumed herein that the image of cross hair 76 will not appear because of the light intensity level but in the event that it does appear it will be on the same side as the image of cross hair 66 and wider displaced from the direct views of cross hairs 76 and 66 than does the image of cross hair 66. It will also be noted that the direction of displacement of the inner gimbal can readily be determined by the position of the etched line 61 relative to the direct views of cross hairs 76 and 66 since it will appear on the side of these cross hairs toward which the inner gimbal 10 is tilted. Such a condition of disalignment would also appear in the output of signal device 30. In Figure 5 there is shown an example of alignment between the frame 26 and inner gimbal 10 with a condition of disalignment between the outer gimbal 20 and the line of sight formed by the beforementioned elements. The cross hair 76 and the etched line 61 of mirror 60 coincide to establish the line of sight reference and the direct view of cross hair 66 and its image in mirror 60 are offset to one side or the other from the cross hair 76 and line 61 depending upon the direction of disalignment of the azimuth gimbal 20. In such a case cross hair 76 will be displaced further from the line of sight than would the image be but the ability of the human eye to distinguish between the cross hair and its image is doubtful. Such a relationship between the cross hairs and the images will, however, indicate a condition of disalignment and the direction in which the disalignment occurs.

The condition of disalignment of both inner and outer gimbals from their normal positions with respect to the frame 26 is not shown, but it will be understood that neither the cross hair 66 nor line 61 nor the images will align with cross hair 76. Such disalignment though is improbable and can be corrected by using cross hair 76 and either cross hair 66 or line 61 as lines of sight and compensating for the disalignment of the opposite element and the associated signal generator and thereafter repeating this process utilizing a second line of sight until the elements are aligned and the signal generators give the correct outputs.

Figure 1 also shows in phantom a cylindrical cover member 80 which is adapted to be mounted to the base portion 25 of the frame through suitable means not shown and enclose the gimbals and the upstanding portion of the frame together with the gyro wheels. A windowed aperture indicated generally at 81 in phantom is provided in this casing member to be positioned adjacent the reticles 75 of the frame 26 such that the alignment apparatus may be checked with the cover in position on the gyroscope.

In considering this invention it should be kept in mind that the present disclosure is intended to be illustrative only and that the scope of the invention is determined only by the appended claims.

We claim as our invention:

1. In combination with a gyroscope having a rotatable mass supported on an inner gimbal which in turn is pivotally mounted on an outer gimbal with the outer gimbal pivotally mounted on a frame for the gyroscope, a pair of signal generating means mounted on said gyroscope and associated respectively with each of said gimbals such that displacement of said gimbals relative to one another and relative to said frame operate to produce an output in said signal generators which have normally a zero output when said gimbals and said frame are in predetermined relative positions, of means included on the gyroscope for checking the relative positions of the gimbals and the frame to determine whether they are in said predetermined relative positions when the outputs of said signal generators are at zero output including a pair of transparent members each with an index thereon mounted on said frame and said outer gimbal and a mirror having an indicia thereon mounted on said inner gimbal in such positions that the indices of said transparent members and said mirror together with the reflection of the index of the outer gimbal from the mirror are aligned when the gimbals and said frame are in said predetermined relative positions.

2. In combination with a gyroscope having a rotatable mass supported on an inner gimbal which in turn is pivotally mounted on an outer gimbal with the outer gimbal pivotally mounted on a frame for the gyroscope, a pair of signal generating means mounted on said gyroscope and associated respectively with each of said gimbals such that displacement of said gimbals relative to one another and relative to said frame operate to produce an output in said signal generators which have normally a zero output when said gimbals and said frame are in predetermined relative positions, of means included on the gyroscope for checking the relative positions of the gimbals and the frame to determine whether they are in said predetermined relative positions when the outputs of said signal generators are at zero output including a pair of reticles each with a cross hair thereon mounted on said frame and said outer gimbal and a mirror with indicia means thereon mounted on said inner gimbal in such positions that the cross hairs of said reticles and said indicia means together with the reflection of the cross hair of the outer gimbal from the mirror are aligned when the gimbals and said frame are in said predetermined relative positions.

3. In combination with a gyroscope having a rotatable mass supported on an inner gimbal which in turn is pivotally mounted on an outer gimbal with the outer gimbal pivotally mounted on a frame for the gyroscope, a pair of signal generating means mounted on said gyroscope and associated respectively with each of said gimbals such that displacement of said gimbals relative to one another and relative to said frame operate to produce an output in said signal generators which have normally a zero output when said gimbals and said frame are in predetermined relative positions, of means included on the gyroscope for checking the relative positions of the gimbals and the frame to determine whether they are in said predetermined relative positions when the outputs of said signal generators are at zero output including a pair of members each with a hair line thereon mounted on said frame and said outer gimbal and a mirror with indicia means thereon mounted on said inner gimbal in such positions that the hair lines of said members and said indicia means together with the reflections of the hair lines of said members from the mirror are aligned when the gimbals and said frame are in said predetermined relative positions.

4. In combination with a gyroscope having a rotatable mass supported on an inner gimbal which in turn is pivotally mounted on an outer gimbal with the outer gimbal pivotally mounted on a frame for the gyroscope, a pair of signal generating means mounted on said gyroscope and associated respectively with each of said gimbals such that displacement of said gimbals relative to one another and relative to said frame operate to produce an output in said signal generators which have normally a zero output when said gimbals and said frame are in predetermined relative positions, of means included on the gyroscope for checking the relative positions of the gimbals and the frame to determine whether they are in said predetermined relative positions when the outputs of said signal generators are at zero output including a pair of members each with a hair line thereon mounted on said frame and said outer gimbal and a mirror with an etched line thereon mounted on said inner gimbal in such positions that the hair lines of said members and said etched line together with the reflection of the hair line of the outer gimbal from the mirror are aligned when the gimbals and said frame are in said predetermined relative positions, one of said hair lines having an additional identifying mark.

5. In combination with a gyroscope having a rotatable mass supported on an inner gimbal which in turn is pivotally mounted on an outer gimbal with the outer gimbal pivotally mounted on a frame for the gyroscope, a pair of signal generating means mounted on said gyroscope and associated respectively with each of said gimbals such that displacement of said gimbals relative to one another and relative to said frame operate to produce an output in said signal generators which have normally a zero output when said gimbals and said frame are in predetermined relative positions, of means included on the gyroscope for checking the relative positions of the gimbals and the frame to determine whether they are in said predetermined relative positions when the outputs of said signal generators are at zero output including a pair of reticles each with a cross hair thereon mounted on said frame and said outer gimbal and a mirror with indicia means thereon mounted on said inner gimbal in such positions that the cross hairs of said members and said indicia means together with the reflection of the cross hair of the outer gimbal from the mirror gimbal are aligned when the gimbals and said frame are in said predetermined relative positions, casing means enclosing said inner and outer gimbals of said gyroscope and a portion of said frame and being attached to a base portion of said frame, and a transparent member positioned in an aperture in said casing means adjacent the reticle in the frame such as to provide for visual inspection of said reticles and said mirror.

6. In a gyroscope device having a cardanic mounting means including a plurality of gimbals to provide for a plurality of degrees of freedom of the device, a frame supporting said cardanic mounting means, a plurality of members attached to said gimbals and said frame which when said gimbals bear a particular relationship to said frame are aligned, and indicia means included in said members each having identifying characteristics, said indicia means of said members being visible to observation and being positioned in a predetermined relationship when said gimbals of said cardanic mounting means and said frame are in said particular relationship.

7. In a gyroscope device having a cardanic mounting means including a plurality of gimbals to provide for a plurality of degrees of freedom of the device, a frame supporting said cardanic mounting means, a plurality of members attached to said gimbals and said frame which when said gimbals bear a particular relationship to said frame are aligned, and indicia means included in said members and having differing identifying characteristics, said indicia means of said members being visible to observation and being aligned when said gimbals of said cardanic mounting means and said frame are in said particular relationship.

8. In a gyroscope device having a cardanic mounting means including a plurality of gimbals to provide for a plurality of degrees of freedom, a frame supporting said cardanic mounting means, a plurality of members attached to said frame and to all but the inner-most gimbal which when said gimbals and said frame bear a particular relationship are aligned, a mirror mounted on said inner-most gimbal, said mirror also being aligned with said members when said gimbals bear said particular relationship with said frame, and indicia means included in said members, said indicia of said members being visible to observation and being aligned when said gimbals of said cardanic mounting means and said frame are in said particular relationship.

9. In a gyroscope device having a cardanic mounting means including a plurality of gimbals to provide for a plurality of degrees of freedom, a frame supporting said cardanic mounting means, a plurality of members attached to said frame and to all but the inner-most gimbal which when said gimbals and said frame bear a particular relationship are aligned, a mirror mounted on said inner-most gimbal, said mirror also being aligned with said members when said gimbals bear said particular relationship with said frame, indicia means included in said members, said indicia of said members being visible to observation and being aligned when said gimbals of said cardanic mounting means and said frame are in said particular relationship, and casing means including a transparent window means mounted on said frame and enclosing said cardanic mounting means in a portion of said frame, said window means in said casing means being positioned adjacent said member on said frame and allowing light to be transmitted through said members to said mirror.

10. In combination with a gyroscope having a frame with a plurality of dowel holes in the base portion thereof, a sub-base assembly adapted to be mounted on an object to which the gyroscope is to be attached, and a plurality of dowel pins included in said sub-base assembly and adapted to fit into said dowel holes of said base portion of said frame to mount said gyroscope in a predetermined relationship to said object.

11. In combination with a gyroscope having a frame with a plurality of dowel holes in the base portion thereof, a sub-base assembly adapted to be mounted on an object to which the gyroscope is to be attached, and a plurality of dowel pins included in said sub-base assembly and adapted to fit into said dowel holes of said base portion of said frame to mount said gyroscope in a predetermined relationship to said object, said dowel pins being so constructed that they fit into said dowel holes in said frame and mount said frame in only one position.

12. In a gyroscope device having a cardanic mounting means including a plurality of gimbals to provide for a plurality of degrees of freedom, a frame supporting said cardanic mounting means, a plurality of members attached to said gimbals and said frame which when said gimbals bear a particular relationship to said frame are aligned, and indicia means included in said members each having identifying characteristics, said indicia means of said members being visible to observation and being positioned in a predetermined relationship when said gimbals of said cardanic mounting means and said frame are in said particular relationship, said frame having a base portion with a plurality of dowel holes therethrough, a sub-base assembly adapted to be mounted on an object to which the gyroscope is to be attached, and a plurality of dowel pins included in said sub-base assembly and adapted to fit into the dowel holes in said base portion of said frame to mount said gyroscope in a predetermined relationship with respect to said object.

13. In a gyroscope device having a cardanic mounting means including a plurality of gimbals to provide for a plurality of degrees of freedom, a frame supporting said cardanic mounting means, a plurality of members attached to said gimbals and said frame which when said gimbals bear a particular relationship to said frame are aligned, and indicia means included in said members each having identifying characteristics, said indicia means of said members being visible to observation and being positioned in a predetermined relationship when said gimbals of said cardanic mounting means and said frame are in said particular relationship, said frame having a base portion with a plurality of dowel holes therethrough, a sub-base assembly adapted to be mounted on an object to which the gyroscope is to be attached, and a plurality of dowel pins included in said sub-assembly and adapted to fit into the dowel holes in said base portion of said frame to mount said gyroscope in a predetermined relationship with respect to said object, said dowel pins being so constructed that they fit into the dowel holes in said frame and mount said frame in only one position.

References Cited in the file of this patent
UNITED STATES PATENTS

| Number | Name | Date |
|---|---|---|
| 925,709 | Leavitt | June 22, 1909 |
| 1,250,592 | Klahn | Dec. 18, 1917 |
| 1,546,372 | Fairchild | July 21, 1925 |
| 2,269,103 | Harding et al. | Jan. 6, 1942 |
| 2,350,303 | Fedde | May 30, 1944 |
| 2,512,598 | Barkalow | June 27, 1950 |